(12) United States Patent
Larsen

(10) Patent No.: US 6,423,451 B1
(45) Date of Patent: *Jul. 23, 2002

(54) LEAD-ACID CELL AND POSITIVE PLATE AND ALLOY THEREFOR

(75) Inventor: Steven R. Larsen, Lino Lakes, MN (US)

(73) Assignee: GNB Technologies, Inc., Mendota Heights, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/072,401

(22) Filed: May 4, 1998

Related U.S. Application Data

(60) Provisional application No. 60/045,801, filed on May 7, 1997.

(51) Int. Cl.[7] .................... H01M 4/14; H01M 4/73
(52) U.S. Cl. .................... 429/245; 429/225; 29/2
(58) Field of Search .................. 429/245, 225; 29/2

(56) References Cited

U.S. PATENT DOCUMENTS

| | | | |
|---|---|---|---|
| 2,860,969 A | 11/1958 | Walsh | 75/167 |
| 3,287,165 A | 11/1966 | Jensen | 136/65 |
| 3,762,942 A | 10/1973 | Jache | 136/26 |
| 4,092,462 A | 5/1978 | Giess et al. | 429/50 |
| 4,125,690 A | 11/1978 | Bagshaw et al. | 429/226 |
| 4,279,977 A | 7/1981 | Matter | 429/245 |
| 4,401,730 A | 8/1983 | Szymborski et al. | 429/53 |
| 4,605,605 A | 8/1986 | Cannone | |
| 4,725,404 A | 2/1988 | Reif et al. | 420/565 |
| 4,805,277 A | 2/1989 | Yasuda et al. | 29/2 |
| 4,939,051 A | 7/1990 | Yasuda et al. | 29/2 |
| 5,126,217 A | 6/1992 | Rao | 429/149 |
| 5,169,734 A | 12/1992 | Rao et al. | 429/160 |
| 5,266,423 A | 11/1993 | Sklarchuk | 429/225 |
| 5,298,350 A | 3/1994 | Rao | 429/245 |
| 5,434,025 A | 7/1995 | Rao et al. | 429/245 |
| 5,691,087 A | * 11/1997 | Rao et al. | 429/245 |
| 5,834,141 A | * 11/1998 | Anderson et al. | 429/245 |
| 5,858,575 A | * 1/1999 | Chen | 429/245 |
| 5,874,186 A | * 2/1999 | Rao et al. | 429/242 |

FOREIGN PATENT DOCUMENTS

| | | |
|---|---|---|
| DE | 2 758 940 | 7/1979 |
| JP | 57-74973 | 5/1982 |
| JP | 60-220561 | 11/1982 |

OTHER PUBLICATIONS

Bagshaw, "Lead Alloys: past, present, and future". J. Power Sources, vol. 53, pp. 25–30, 1995.*

Fouache et al., "Effect of calcium, tin and silver contents in . . . grid manufacture" J. Power Sources, vol. 78, pp. 12–22, 1999.*

Bashtavelova et al., "The PbO2 agglomerate of spheres . . . " J. Power Sources, vol. 67, pp. 93–103, 1997.*

(List continued on next page.)

Primary Examiner—Carol Chaney
(74) Attorney, Agent, or Firm—Morrison & Foerster LLP

(57) ABSTRACT

A sealed lead-acid cell and positive plate for a sealed lead-acid cell are provided. The positive plate comprises a grid supporting structure having a layer of active material pasted thereto, the grid supporting structure comprising a lead-based alloy consisting essentially of lead, from about 0.02% to about 0.05% calcium, from about 1.5% to about 3.0% tin, and from about 0.01% to about 0.05% silver. A positive plate in accordance with the invention has excellent mechanical properties, and is satisfactory for use in a lead-acid cell.

12 Claims, 17 Drawing Sheets

OTHER PUBLICATIONS

Albert et al., "Improved Lead Alloys for Lead/Acid Positive Grids in Electric–Vehicle Applications," *Journal of Power Sources*, vol. 67, pp. 257–265 (Jul. 1997).

Bagshaw, "Lead Alloys: Past, Present and Future," *Journal of Power Sources*, vol. 53, pp. 25–30 (Feb. 1995).

Bui et al., "The Tin Effect in Lead–Calcium Alloys", *Journal of Power Sources*, vol. 67, pp. 61–67 (Jul. 1997).

Bouirden et al., "Discontinuous and Continuous Hardening Processes in Calcium and Calcium–Tin Micro–Alloyed Lead: Influence of "Secondary–Lead" Impurities," *Journal of Power Sources*, vol. 33(1–4), pp. 27–50 (Jan. 1991). (Abstract only).

Chen et al., "Study of Kinetics of Oxygen Evolution on Lead Alloy Anodes", *Journal of Central South University of Technology*, vol. 4(1), pp. 69–72 (1997). (Abstract only).

Tang et al., "Microstructure and Properties of Continuously Cast, Lead–Alloy Strip for Lead/Acid Battery Grids," *Journal of Power Sources*, vol. 59, pp. 63–69 (Mar. 1996).

Zhong et al., "Evaluation of Lead–Calcium–Tin–Aluminum Grid Alloys for Valve–Regulated Lead/Acid Batteries," *Journal of Power Sources*, vol. 59, pp. 123–129 (Mar. 1996).

\* cited by examiner

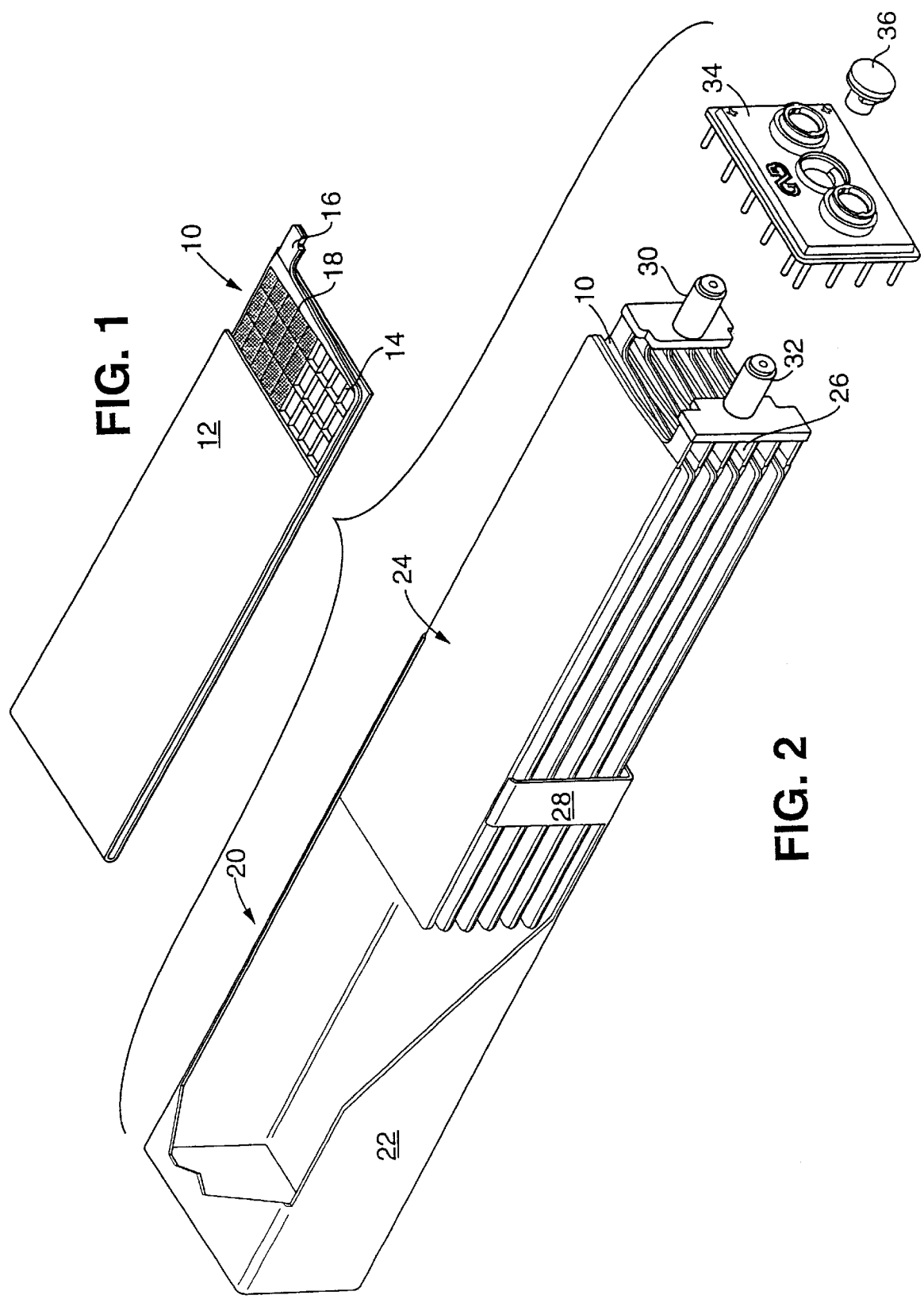

LEAD-ACID CELL AND POSITIVE PLATE AND ALLOY THEREFOR

This application claim benefit to provisional application 60/045,801 May 7, 1997.

TECHNICAL FIELD OF THE INVENTION

The present invention relates to lead-acid cells, and, more particularly, to calcium-tin-silver lead-based alloys used for the positive grid alloys in such cells.

BACKGROUND OF THE INVENTION

Sealed lead-acid cells (often termed "VRLA" cells, viz., valve-regulated lead-acid) are widely used in commerce today. As is known, sealed lead-acid cells utilize highly absorbent separators, and the necessary electrolyte is absorbed in the separators and plates. Accordingly, such cells may be used in any attitude without electrolyte spillage as would occur with a flooded electrolyte lead-acid battery. Such cells are normally sealed from the atmosphere by a valve designed to regulate the internal pressure within the cell so as to provide what is termed an effective "oxygen recombination cycle" (hence the use of the terms "sealed" and "valve-regulated").

The advantages that are provided by sealed lead-acid cells in comparison to conventional, flooded lead-acid batteries are substantial and varied. Sealed lead-acid technology thus offers substantial benefits by eliminating maintenance (e.g., cell watering), expense (e.g., acid purchases), environmental (e.g., expensive waste treatment systems and air-borne acid mist) and safety (e.g., acid burns) concerns.

It is thus not surprising that sealed lead-acid cells are widely used in commerce today for various applications that have widely differing requirements. In one type of application, generally termed as stationary applications, lead-acid cells are used, for example, for load leveling, emergency lighting in commercial buildings, as standby power for cable television systems, and in uninterruptible power supplies. The uninterruptible power supply may be used to back up electronic equipment, such as, for example, telecommunication and computer systems, and even as a backup energy source for entire manufacturing plants. When the principal power supply to the electronic equipment has been cut off, such as during a power outage, the sealed cells (typically many electronically connected together) provide a source of reserve power to allow the telecommunication or computer system to remain operational until the principal power supply can be restored. The uninterruptible power supply also will accommodate short, or intermittent, losses in power, so that the function of the electronic equipment will not be impaired during a brief power outage.

In addition, there are many applications where sealed lead-acid cells are used in what are termed as motive power application. Sealed lead-acid cells are thus used as the power source for electric vehicles, fork-lift trucks, and the like.

The performance requirements for these two basic types of applications vary significantly. On the one hand, stationary applications are generally float applications, i.e., the cells are generally on float (i.e., an external voltage supply connected to the cells is held slightly above the cell potential to maintain charge), with an occasional need for a deep discharge when the main power source fails or is otherwise interrupted.

On the other hand, motive power applications require repetitive deep discharges, down to a 80% depth of discharge or even somewhat greater. Suitable cells must thus be capable of enduring repetitive charge-deep discharge-charge cycling regimes for up to 500 cycles or even more. Indeed, it would be desirable to provide cells capable of enduring from 1,000 to 2,000 cycles or so.

Developing grid alloys that adequately satisfy the diverse criteria for both stand-by and motive power applications has been largely unsuccessful. This lack of success has resulted even though substantial attention has been given to this issue by those working in this field.

This relative lack of success can perhaps best be appreciated when the principal criteria are considered because such criteria are stringent and are varied. These criteria must be satisfied, regardless of the type of application. In general, and by way of a summary, suitable alloys must be capable of being cast into satisfactory grids and must impart adequate mechanical properties to the grid. Still further, the alloys must impart satisfactory electrical performance to the VRLA cell in the intended application. Satisfactory alloys thus must impart the desired corrosion resistance, not result in thermal runaway (i.e., must not raise the tendency for the cell to lose water via gassing) and avoid premature capacity loss (sometimes referred to as "PCL").

More particularly, and considering each of the criteria previously summarized, suitable alloys in the first instance must be capable of being cast into grids by the desired technique, i.e., the cast grids must be low in defects as is known (e.g., relative freedom from voids, tears, microcracks and the like). Such casting techniques range from conventional gravity casting ("book molds" or the like) to continuous processes using expanded metal techniques.

The resulting cast grids need to be strong enough to endure processing into plates and assembly into cells in conventionally used equipment. Even further, suitable grids must maintain satisfactory mechanical properties throughout the expected service life. Any substantial loss in the desired mechanical properties during service life can adversely impact upon the cell performance as will be more fully discussed hereinafter.

Considering now the electrochemical performance required, the grid alloy for the positive plates must yield a cell having adequate corrosion resistance. Yet, the use of a continuous direct casting process, desirable from the standpoint of economics, ostensibly can compromise corrosion resistance. Such continuous processes thus orient the grains in the grids, thereby making the intergranular path shorter and more susceptible to corrosion attack and to early failures.

Positive grid corrosion thus is a primary mode of failure of VRLA lead-acid cells. When positive grid corrosion occurs, this lowers the electrical conductivity of the cell itself. Cell failure occurs when the corrosion-induced decrease in the conductivity of the grid causes the discharge voltage to drop below a value acceptable for a particular application.

A second failure mechanism, also associated with grid corrosion, involves failure due to "grid growth." During the service life of a lead-acid cell, the positive grid corrodes; and the corrosion products form on the surface of the grid. In most cases, the corrosion products form at the grain boundaries and grid surface of the lead-acid where the corrosion process has penetrated the interior of the "wires" of the grid. These corrosion products are generally much harder than the lead alloy forming the grid and are less dense. Due to the stresses created by these conditions, the grid alloy moves or grows to accommodate the bulky corrosion products. This physical displacement of the grid causes an increase in the length and/or width of the grid. The increase in size of the grid may be nonuniform. A corrosion-induced change in the dimension of the grid is generally called "grid growth" (or sometimes "creep").

When grid growth occurs, the movement and expansion of the grid begins to break the electrical contact between the positive active material and the grid itself. This movement and expansion prevents the passage of electricity from some reaction sites to the grid and thereby lowers the electrical discharge capacity of the cell. As this grid growth continues, more of the positive active material becomes electrically isolated from the grid and the discharge capacity of the cell decays below that required for the particular application. The mechanical properties of the alloy thus are important to avoid undue creep during service life.

Still further, and importantly, the use of the alloys must not result in thermal runaway. VRLA cells must avoid conditions in service in which the temperature within the cell increases uncontrollably and irreversibly.

It has been hypothesized that excessive water loss resulting in cell dry-out is the driving mechanism for thermal runaway in VRLA cells. This water loss can be caused by hydrogen gassing at the negative electrode or oxygen gassing at the positive electrode through the electrolysis of water, or both.

As the water content and thus the cell saturation is reduced, the oxygen recombination efficiency is increased. Since this recombination reaction is highly exothermic, this tends to heat the cell. As the temperature rises, the cell tends to generate gas; and the recombination processes become even more efficient, thereby further increasing the cell temperature. In similar fashion, water loss increases the cell electrical resistance; and such increased cell resistance increases the cell temperature, thereby further increasing water loss. The cell is in thermal runaway.

Accordingly, to avoid alloys that will push cells into thermal runaway, the effect of the alloy and its constituents on gassing at both electrodes must be taken into consideration. As is well known, antimonial alloys have been considered necessary for positive grids where the cells are required in service to endure deep discharge-charge cycling regimes.

Yet, in general, although not exclusively, antimonial alloys cause thermal runaway in VRLA cells due to excessive gassing at both electrodes. Antimony thus leaches out from the positive grid as corrosion takes place, dissolving into the electrolyte, ultimately migrating to and "electroplating" onto the negative electrode. These antimony sites on the negative electrode thus become preferential to hydrogen gassing. Additionally, the presence of antimony on the negative electrode increases the self-discharge and thereby heats the cell since the self-discharge current is also reflected in the float current.

Poisoning of the positive electrode, of course, also must be avoided. Undue gassing at the positive electrode can thus lead to thermal runaway.

Further, the alloys must maintain adequate contact for electrical conductance throughout the desired service life. Otherwise, the cell will experience what has been termed as "premature capacity loss" ("PCL").

PCL can also occur through loss of contact due to cracking of the corrosion layer or from a nonconductive film generated in the corrosion layer. Because of the complexity and the substantial potential adverse effects, this is a difficult criteria to achieve in combination with the other necessary criteria.

Lastly, it would be desirable to provide positive grid alloys capable of enduring deep discharge-charge cycling regimes. Satisfying this criteria would also allow use of such alloys for both motive power and stationary VRLA applications.

One singular exception to the lack of success in developing positive grid alloys for VRLA motive power and stationary applications is U.S. Pat. No. 4,401,730, issued to Joseph Szymborski et al., and assigned to the assignee of the present invention. The Szymborski '730 patent thus discloses a sealed, deep-cycle, lead-acid cell including a cadmium-antimony lead-based alloy in the positive grid.

These alloys have satisfactory mechanical properties, i.e., good mechanical processability in cell assembly, high strength and toughness. Such cadmium-antimony lead-based alloys can successfully be used in sealed lead-acid cells, while avoiding thermal runaway and other problems often encountered when using antimony-containing alloys.

Although these alloys have been found to have exemplary properties, such alloys also have significant drawbacks. First, cadmium has been identified as a carcinogen. Special precautions must now be employed when preparing and handling cadmium-containing materials. Moreover, the presence of cadmium makes such positive plates difficult to dispose of after the useful service life of the lead-acid cell. All scrap must be segregated and shipped to a smelter that is permitted to recycle cadmium. Indeed, some countries currently will not allow transport of hazardous substances, like cadmium, across their borders. Accordingly, it would be desirable to provide an alloy for use in a positive plate in a lead-acid cell that does not require the inclusion of cadmium, yet would possess the many desirable characteristics of the cadmium-antimony lead-based alloys disclosed in the '730 patent.

Indeed, while these cadmium-antimony alloys have been used commercially for years and despite considerable efforts to find other alloys that satisfy the diverse criteria, satisfactory alloys are yet to be developed. Some of this effort concerns the calcium-tin-silver lead-based alloy family. Yet, despite all this effort, satisfactory alloys have not been discovered.

Accordingly, there still exists a need for a lead-based alloy which can adequately satisfy the diverse requirements needed for making grids for positive plates used in sealed lead-acid cells for motive power and stationary applications while avoiding the use of cadmium.

Accordingly, it is an object of the present invention to provide a lead-based alloy for a positive plate for a lead-acid cell that does not employ cadmium as an alloying ingredient, yet possesses adequate characteristics to allow use for VRLA motive power and stationary applications.

It is an additional object of the invention to provide alloys cast into grids by conventionally used techniques and having satisfactory mechanical properties to allow use in conventional lead-acid processes and assembly.

Another object of this invention is to provide a positive grid alloy that is not overly susceptible to premature capacity loss of the cell.

Yet another object of this invention is to provide a positive grid alloy that can be used to achieve satisfactory cycle life for stand-by and motive power applications.

Other objects and advantages of the present invention can be seen from the following description of the invention.

BRIEF SUMMARY OF THE INVENTION

In accordance with this invention, it has been discovered that highly desirable positive grid alloys, particularly for VRLA cells can be made using calcium-tin-silver lead-based alloys when the alloy composition is maintained within certain defined limits. Thus, it has been found that lead-based alloys having from about 0.02% to about 0.05% calcium, from about 1.5% to about 3.0% tin, and from about 0.01% to about 0.05% silver, the percentages being based upon the total weight of the alloy, possess highly desirable characteristics. Optionally, the alloys of this invention can include from about 0.003% to 0.03% by weight aluminum.

Indeed, the calcium-tin-silver alloys of this invention possess properties allowing use in VRLA cells for motive power and stationary applications.

DESCRIPTION OF THE FIGURES

FIG. 1 is a perspective view of a positive plate in accordance with the invention enveloped in a separator, with the separator and the active material broken away to show the grid;

FIG. 2 is a perspective view of a lead-acid cell in accordance with the present invention, partially exploded to illustrate the internal configuration;

DESCRIPTION OF THE PREFERRED EMBODIMENTS

Figure 3:
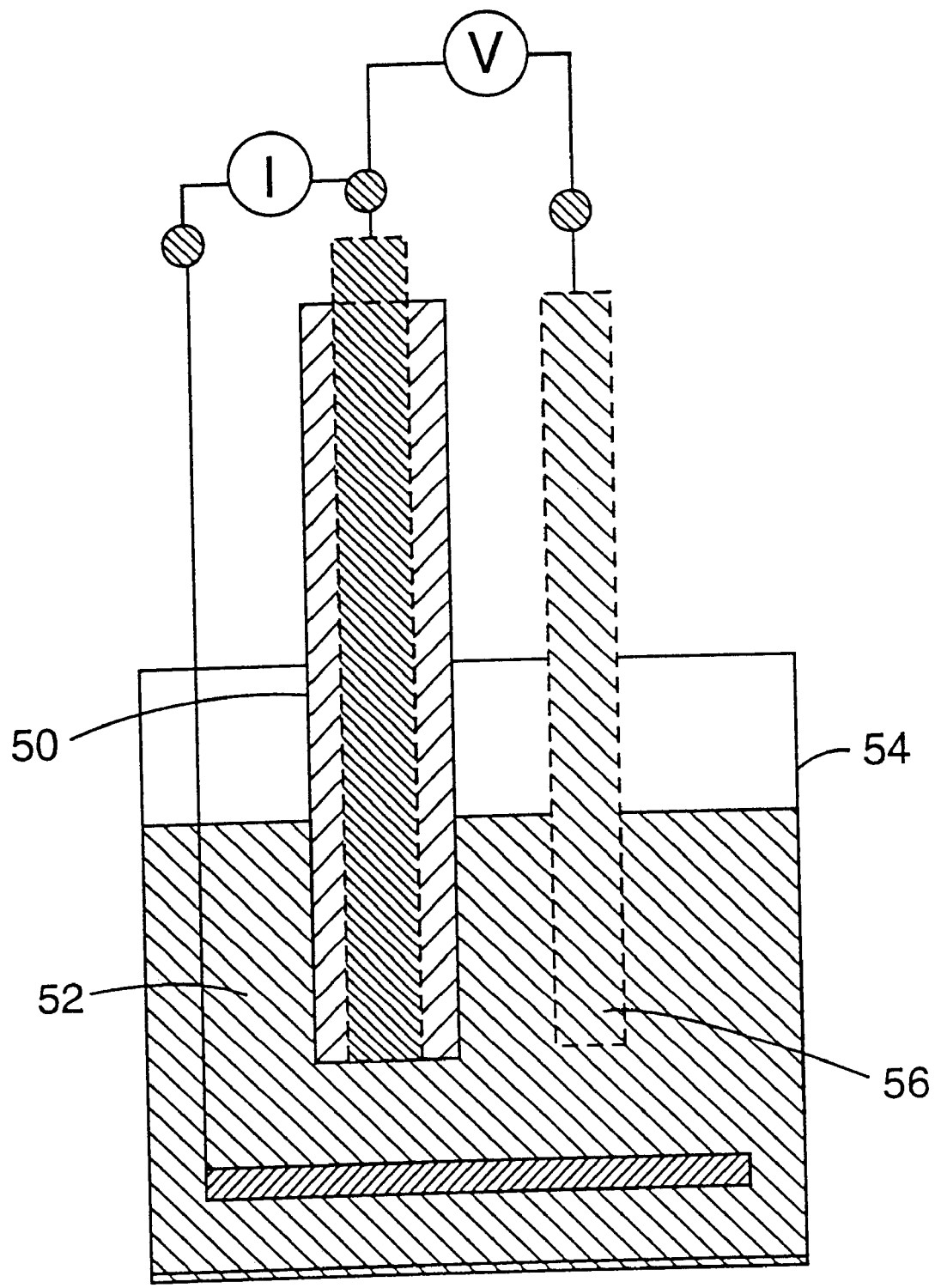
FIG. 3 is a diagrammatic view showing the apparatus used to evaluate the effects of alloy composition on gassing at the positive electrode.

Although each of the alloying ingredients utilized in the alloys of the present invention contributes to the overall performance of the alloy, it is difficult to separate the benefits provided individually by the alloying ingredients, because of the synergy achieved when these ingredients are used collectively in the amounts specified herein. Thus, there is a careful balance which results when the proper alloying ingredient level is maintained. Upsetting that balance can affect many of the desired characteristics. However, to provide an understanding of the considerations involved in selecting the various amounts of alloying ingredients, the function of each of these ingredients will be separately discussed.

With respect to calcium as an alloy constituent, calcium should be present in an amount sufficient to impart to the cast grids of this invention the desired casting characteristics and mechanical properties. To achieve such characteristics, it has been found that the calcium content should be at least about 0.02% by weight of the total alloy.

However, the calcium level must be carefully controlled to avoid excessive amounts which would provide an alloy composition that has an unduly high tendency to recrystallize after solidification, significantly altering the structure from that of the as-cast structure. More particularly, when the calcium content is excessive, there is a propensity for recrystallization after solidification, creating a grid structure that is unduly susceptible to premature failure due to highly erratic intergranular corrosion. The corrosion thus occurs through intergranular corrosion, and recrystallized alloys tend to have smaller grains which in turn are more susceptible to intergranular corrosion due to higher calcium-based intermetallics in the new recrystallized grains.

Accordingly, to impart adequate mechanical properties while avoiding calcium levels increasing the propensity for recrystallization, it has thus been found suitable to mention the calcium in the alloys of this invention in the range of from about 0.02 to 0.05% by weight of the total alloy. More preferably, the calcium content is from about 0.03 to about 0.04%.

As to the silver constituent, this cooperates with the other alloying ingredients to provide the resulting alloy with the requisite casting and mechanical property characteristics. More particularly, silver present at an appropriate level, imparts highly desirable mechanical properties to the resulting alloy that could not otherwise be provided at the levels of the other alloying ingredients.

Thus, it has been found that the inclusion of silver in an amount of at least about 0.01% by weight of the total alloy will provide the desired casting and mechanical properties. An important aspect of the inclusion of silver is that the resulting alloys can be heat treated to even further enhance the mechanical properties of grids made using these alloys. Such heat-treating enhancements are not obtained in calcium-tin lead-based alloys not containing appropriate levels of silver.

Even further, an appropriate level of silver tends to stabilize such alloys against over aging. Thus, in the absence of adequate silver levels, calcium-tin lead-based alloys tend to lose their desirable mechanical properties upon aging. Such a substantial loss in such mechanical properties cannot be tolerated for positive grid alloys for many VRLA applications.

On the other hand, silver is a relatively expensive alloying ingredient so that excessive amounts should be avoided. Indeed, excessive amounts will not significantly enhance, and may even adversely affect, the desired alloy characteristics.

Accordingly, the silver content should be no more than about 0.05% by weight of the total alloy. The preferred composition includes silver in a range of about 0.02% to 0.03%.

As to the tin constituent, the issue is even more complex. Thus, while the tin level will certainly affect the characteristics as the grid is being cast and the mechanical properties of the cast grid, the tin level will also impact upon the issues of corrosion, cycling, thermal runaway, and capacity loss characteristics. These diverse criteria are not fully understood; and, despite the prior work in this field, the impact of the tin level on the characteristics of VRLA cells has not been appreciated to any great extent.

However, in accordance with the present invention, it has been found that the inclusion of tin in the range of from about 1.5% to about 3.0% by weight of the total alloy will impart the desired characteristics to the alloys, grids made using such alloys, and to VRLA cells using such alloys for the positive grids, when such alloys possess appropriate calcium and silver levels. More particularly, it is preferred to maintain the tin in the range of from about 2.0 to about 3.0%, more preferably 2.0% to 2.5%, by weight of the alloy.

Thus, in the preferred embodiment, the alloy consists essentially of lead, calcium, tin, and silver. If desired, however, the alloy may include an amount of aluminum effective to prevent drossing of calcium from the alloy. Aluminum may be present in an amount ranging from about 0.003% to about 0.03%.

Preferably, ingredients other than those previously described are excluded from the alloy, or are present only in trace amounts, such as amounts typically present in commercially available metals. Of course, other ingredients may be added to the alloy if desired, provided the beneficial properties of the alloy are not disturbed by the addition of such ingredients.

The alloy preferably is prepared by blending the ingredients at temperatures of about 800° F. to about 950° F. (426° C. to about 510° C.) until a homogeneous mixture is achieved, and allowing the ingredients to cool. The particular manner in which the alloys of this invention are prepared does not form a part of the present invention. Any desired technique can be used, and appropriate techniques are known.

The alloys described herein may be cast into grids by any of the known techniques used for lead-acid grids. Thus, conventional gravity casting techniques are known in the art and may be used. Other known techniques for casting lead-acid grids include employing wrought or expanded metal techniques. Such techniques may likewise be used, as is desired for the particular application.

With regard to the grid casting parameters, it is preferred to at least minimize, if not eliminate, the generation of temperature gradients. To this end, in contrast to the casting of other calcium lead-based alloys, it is preferred to employ cooler lead temperatures and higher mold temperatures, while providing more insulation (e.g., obtained by conventional corking) in the upper frame and gate area to prevent premature cooling of the lead and associated temperature gradients during solidification. Accordingly, preferred lead/ladle temperatures range from about 770° F. to 800° F. with mold temperatures of about 350° to 930° F. Still further, process stability is important so that the calcium content selected is maintained during the grid manufacturing process. It is thus important to avoid contamination, particularly when aluminum is utilized.

As has been previously noted, the calcium-tin-silver lead-based alloys used in the present invention can be heat-treated to provide enhanced mechanical properties. Any heat-treating techniques may be used. As one illustrative example, it has been found suitable to heat-treat the resulting grids for about 3 hours or so at a temperature of 212° F. (100° C.). Such heat-treating can increase the yield strength from levels of about 3,500–4,000 psi or so up to yield strengths in excess of about 6,000 psi or so.

The particular grid configuration and that of the VRLA cells in which such positive grids are used can be varied as desired. Many configurations are known and may be used.

As one illustrative example, FIG. 1 shows a positive plate, indicated generally at 10, with a separator 12 enveloping the positive plate 10. The positive plate 10 generally comprises a grid 14 having a plate lug 16 and positive active material 18 pasted onto grid 14.

As is known, there are many different configurations for the grid. Additionally, in VRLA cells, the separator is typically an absorbent glass fiber mat. Other commercially available glass fiber separators incorporate polyolefin or other polymeric fibers to replace part of the glass fibers.

For some applications and to complement process control and minimize cracking, tears, voids and the like, it may be desirable to utilize the optimized internal positive grid wire geometry as disclosed in the co-pending Rao application, Ser. No. 08/925,543, filed Sep. 8, 1997, assigned to the assignee of the present invention. As is thus discussed at pages 7 and 14–15 and illustrated in FIGS. 6 and 7 therein, which disclosures are herein incorporated by reference, positive grid internal configurations which are generally cylindrical or elliptical in cross-section facilitate uniform solidification during grid casting and should assist in minimizing, if not eliminating, casting defects.

FIG. 2 illustrates a VRLA cell, indicated generally at 20. The cell 20 thus includes a container or jar 22 retaining snugly therein an element stack, shown generally at 24. The element stack 24 thus comprises a series of positive plates 10 and negative plates 26 alternately disposed and having separators 12 separating adjacent positive and negative plates. Band 28 is used to hold adjacent plates in the desired compression and to facilitate assembly (the band encircling the element stack 24, but being partially broken away in FIG. 2 for illustrative purposes). The VRLA cell 20 likewise includes a positive terminal 30, a negative terminal 32, and a cover 34 affixed to container or jar 22 by any appropriate means, as is known.

Inasmuch as VRLA cells function by oxygen recombination, as is known, a low pressure, self-resealing valve 38 is used to maintain the desired internal pressure within the cell. Many suitable relief valves are known and used.

The following Examples further illustrate the present invention but, of course, should not be construed as in any way limiting its scope. The mechanical properties set forth in these Examples were determined by the following procedures:

Ultimate Tensile Strength (UTS)
Yield Strength (Yield)
Strain (elongation)
Toughness These properties were tested in accordance with ASTM Test No. D638.

The compositions of the alloys set forth in these Examples were determined on the cast alloys.

EXAMPLE 1

This Example illustrates the casting alloys of this invention.

Bars (0.5"×0.25"×4.0") were gravity cast using alloy blend at 850° F. while maintaining the mold at about 350° F. (176° C.).

Table 1 sets forth the respective alloy compositions which were cast:

TABLE 1

| Alloy | Alloying Constituent (Wt. %) | | | |
|---|---|---|---|---|
| | Ca | Ag | Sn | Lead |
| Alloy A | 0.040 | 0.0165 | 3.0 | Balance |
| Alloy B | 0.039 | 0.0336 | 3.0 | Balance |
| Alloy C | 0.038 | 0.045 | 3.0 | Balance |
| Alloy D | 0.040 | 0.045 | 2.0 | Balance |

EXAMPLE 2

This Example illustrates the mechanical properties of the cast bars obtained using Alloys A–D of Example 1.

The mechanical properties of such alloys were tested, and the results are set forth in Table 2:

TABLE 2

| Alloy | Mechanical Properties | | | |
|---|---|---|---|---|
| | UTS (psi) | Yield (psi) | Strain (%) | Toughness (in#/in$^3$) |
| A[1] | 5025 | 3734 | 16.7 | 664 |
| B[2] | 4761 | 3534 | 15.0 | 540 |
| C[3] | 4596 | 3313 | 14.4 | 489 |
| D[4] | 4012 | 3120 | 13.2 | 373 |

[1] 0.04% Ca, 0.0165% Ag, 3.0% Sn
[2] 0.039% Ca, 0.0366% Ag, 3.0% Sn
[3] 0.038% Ca, 0.045% Ag, 3.0% Sn
[4] 0.040% Ca, 0.045% Ag, 2.0% Sn

EXAMPLE 3

This Example illustrates the effects of aging and heat-treating the alloys used in the present invention.

The alloys of Example 1 were allowed to stand at ambient temperature for three days. The mechanical properties evaluated in Example 2 were again evaluated for alloy aging. To evaluate the effects of heat-treating, the alloys were heat-treated in an oven at 200° F. (93° C.) for one hour and at 200° F. for three hours.

TABLE 3

| | UTS (psi) | Yield (psi) | Strain (%) | Toughness (in#/in$^3$) |
|---|---|---|---|---|
| Alloy A | | | | |
| 3-day age | 5527 | 4330 | 14.1 | 661 |
| 1-hr. 200° F. | 7576 | 6216 | 11.5 | 644 |
| 3-hr. 200° F. | 7531 | 6512 | 12.5 | 700 |
| Alloy B | | | | |
| 3-day age | 5096 | 3816 | 15.5 | 607 |
| 1-hr. 200° F. | 7236 | 6040 | 12.6 | 681 |
| 3-hr. 200° F. | 7672 | 6449 | 9.0 | 523 |
| Alloy C | | | | |
| 3-day age | 4069 | 2926 | 8.4 | 260 |
| 1-hr. 200° F. | 6960 | 6105 | 7.6 | 346 |
| 3-hr. 200° F. | 6843 | 6109 | 5.9 | 247 |
| Alloy D | | | | |
| 3-day age | — | — | — | — |
| 1-hr. 200° F. | 6329 | 5510 | 10.1 | 469 |
| 3-hr. 200° F. | 6988 | 6269 | 9.2 | 480 |

As is thus shown, heat treating serves to significantly enhance the mechanical properties of the alloys used in this invention.

EXAMPLE 4

The following Example illustrates the effects of the silver level on the properties of the alloys.

An alloy, Alloy E, having the following composition was prepared:

TABLE 4

| Ingredient | Amount (wt. %) |
|---|---|
| Tin | 2.0 |
| Silver | 0.006 |
| Calcium | 0.040 |
| Lead | Balance |

Thus, Alloy E was comparable to Alloy (D (i.e., 0.049% Ca, 0.045% Ag, and 2.0% Sn), except that the silver concentration was reduced to 0.006%.

Alloy E was subjected to testing as previously described, and the following results were obtained:

TABLE 5

| | UTS (psi) | Yield (psi) | Strain (%) | Toughness (in#/in$^3$) |
|---|---|---|---|---|
| Alloy E | | | | |
| As cast | 2880 | 1578 | 28.6 | 663 |
| 1-hr. 200° F. | 3160 | 2018 | 22.6 | 567 |
| 3-hr. 200° F. | 3756 | 2811 | 17.7 | 534 |

As can be seen, the mechanical properties of Alloy E were substantially lower than those of Alloy D.

EXAMPLE 5

This Example illustrates the testing of calcium-tin-silver lead-based alloys to determine the effect of alloy composition on the oxygen overvoltage at the positive electrode.

The test set-up is shown in FIG. 3. Each of the alloys used was cast into a wire and potted in an epoxy resin, polished to a level of 0.30 microns. The polished surface area was 0.164 cm$^2$. In the schematic, as is shown in FIG. 3, alloy wire tested is shown generally at 50, immersed in 1.310 specific gravity sulfuric acid, shown at 52, positioned in a small reaction vessel 54. A reference electrode (mercury-mercurous sulfate) 56 was immersed in the sulfuric acid solution adjacent the counter-electrode 50 as is shown.

The wire was anodized at 5 mA/cm$^2$ for 45 minutes. Then, the voltage on a reference scale from 1.6 V to 1.2 V was swept, and the oxygen gassing current during the sweep was recorded.

Figure 4:
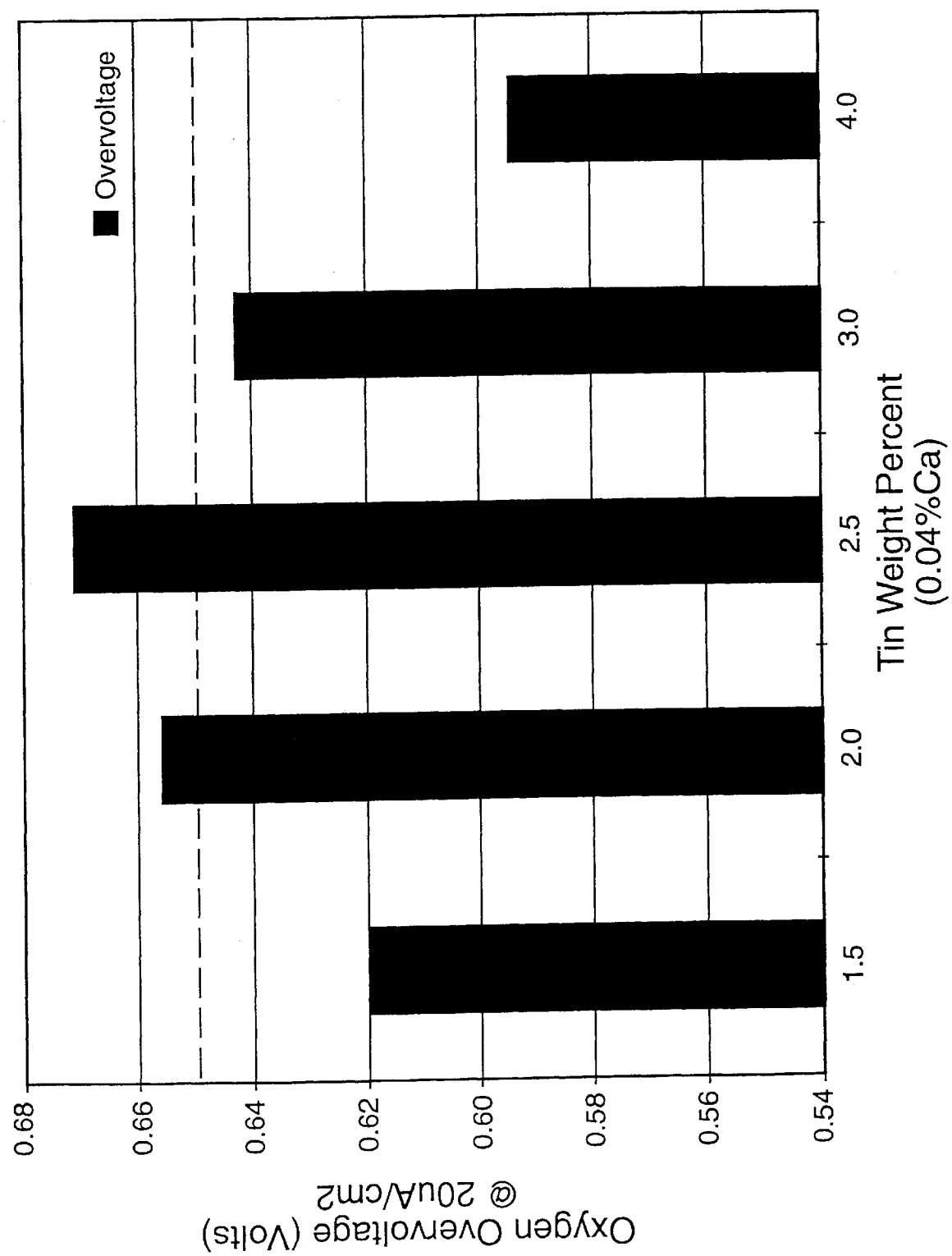
FIG. 4 is a bar graph showing the effect on oxygen overvoltage of the alloy composition.

The results are shown in FIG. 4 for the test conducted at 78° F. (25° C.). As can be seen, increases in tin content reduced the extent of gassing as the tin content was increased from 1.5 by weight of the alloy up to 2.5% tin. Further increases in the tin level then begin to increase gassing.

The performance of such alloys with appropriate tin levels demonstrates that gassing at the positive electrode should not be unduly excessive. Accordingly, since such alloys do not poison the negative electrodes, as do virtually all antimony-containing alloys, the alloys of the present invention should be capable of being used without a tendency for gassing and thermal runaway.

Thus, as has been seen, the alloys of the present invention satisfy the diverse criteria needed for VRLA motive power and stationary applications. The casting characteristics are satisfactory. The mechanical properties are excellent, and, importantly, are not unduly susceptible to loss of such desired properties upon aging. Likewise, positive grids made from such alloys impart adequate electrical performance to the VRLA cells for use in the desired application.

EXAMPLE 6

This Example compares the performance of cells using the positive grid alloys of the present invention with that of other positive grid alloys, as well as comparing the grid growth characteristics and the grid microstructures.

The cells tested were assembled using positive grids made of alloys of varying compositions as described hereinafter. In general, the cells tested can be characterized as follows: 200 Ampere-Hour VRLA cells having 5 positive and 6 negative plates (calcium-lead alloy) with a glass separator and a flame retardant polypropylene container and set to operate at about the 97–98% saturation level.

Figure 5:
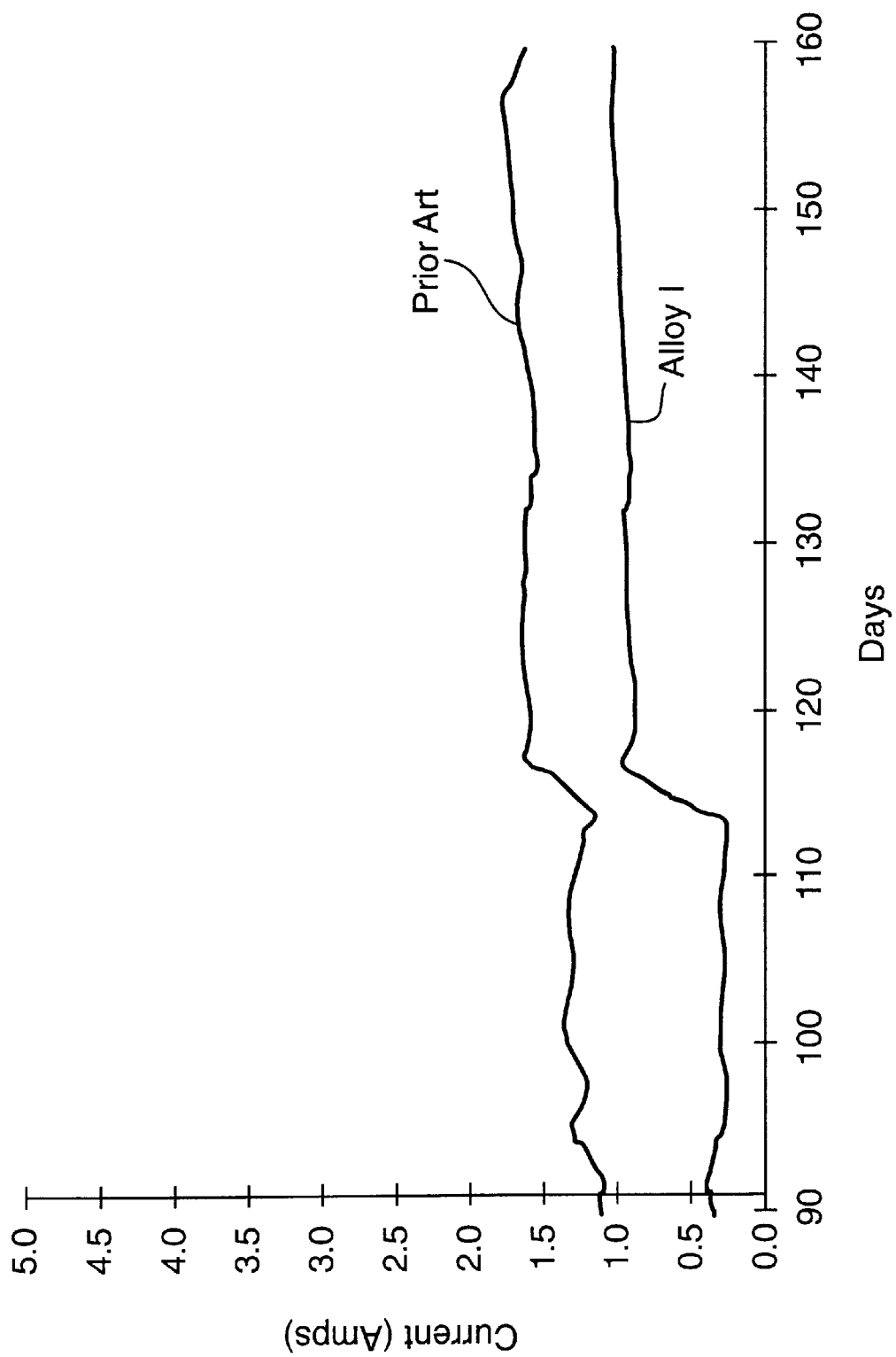
FIG. 5 is a graph of current versus time and showing the float behavior at elevated temperatures and comparing the performance of cells according to the present invention with cells using a prior art alloy.

The float behavior of the cells was determined by floating six cell (12 volt) strings at 2.23 volts per cell in an air oven at 60° C. and 65° C. after about 115 days. FIG. 5 is a graph of the current versus days and compares the float behavior of the cell strings using positive grid Alloy I (an alloy according to the present invention having the composition set forth below) with the cell strings using a commercially used cadmium-antimony-lead positive grid alloy ("Prior Art"). The float behavior of each is considered acceptable.

Additional cell strings using various positive grid alloys were evaluated for grid growth and corrosion. The various alloys used are described as follows:

| Positive Grid | Nominal Composition | | |
|---|---|---|---|
| Alloy Identification | Ca | Sn | Ag |
| Alloy F | 0.04 | 1.5 | — |
| Alloy G | 0.04 | 1.5 | 0.025 |
| Alloy H | 0.04 | 2.0 | — |
| Alloy I | 0.04 | 2.0 | 0.025 |
| Alloy J | 0.04 | 3.0 | — |
| Alloy K | 0.04 | 3.0 | 0.025 |
| Prior Art | Cadmium-Antimony-Lead | | |

Figure 6:
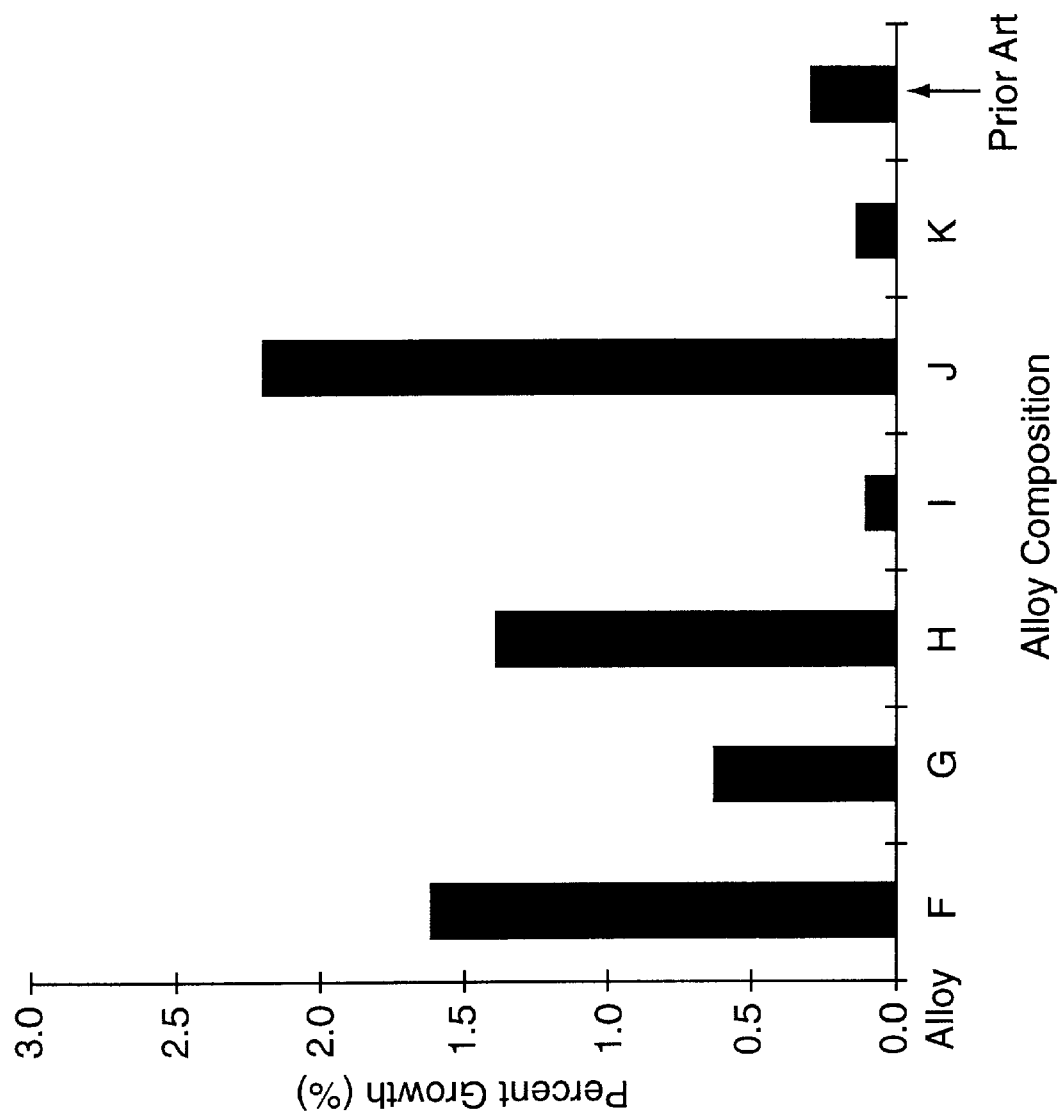
FIG. 6 is a bar graph showing the growth of the width of the positive grids under high temperature float conditions as the grid alloy composition is varied.
Figure 7:
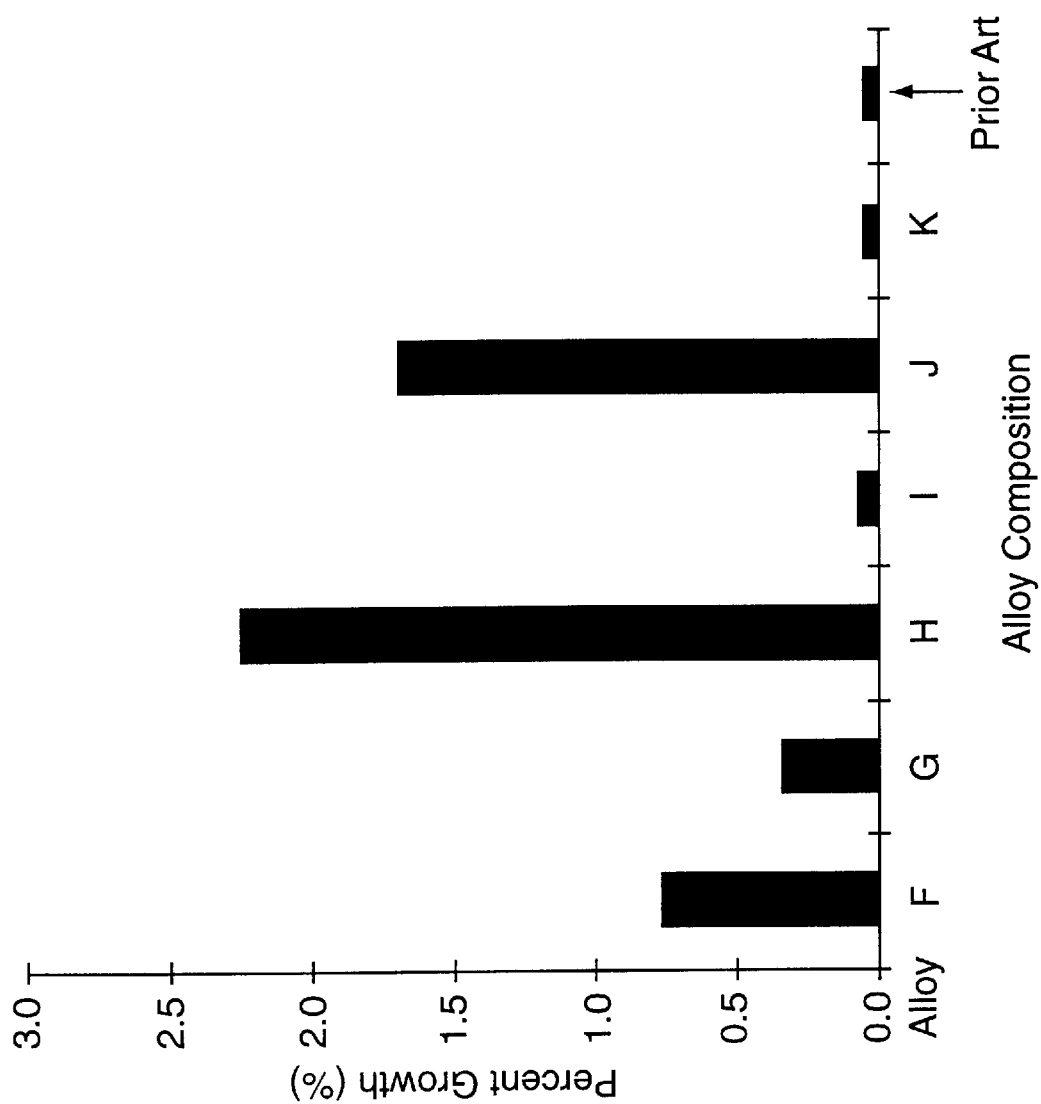
FIG. 7 is a bar graph similar to FIG. 6, except showing the growth of the length of the positive grids as the grid alloy composition is varied.

FIGS. 6 and 7 graphically show the grid growth (FIG. 6 being the growth in the width of the grid and FIG. 7 being in the heighth) after being floated at about 2.23 volts per cell in an air oven held at 60°C. for 12 weeks. As can be seen, the grid growth characteristics of the positive grids in cells having silver-containing positive grids were superior to those where the positive grids had the same tin content but no silver, i.e., G versus F, I versus H, and K versus J. In addition, the positive grid alloys with silver and tin contents in the range of 2–3% appear preferable.

Figure 8:
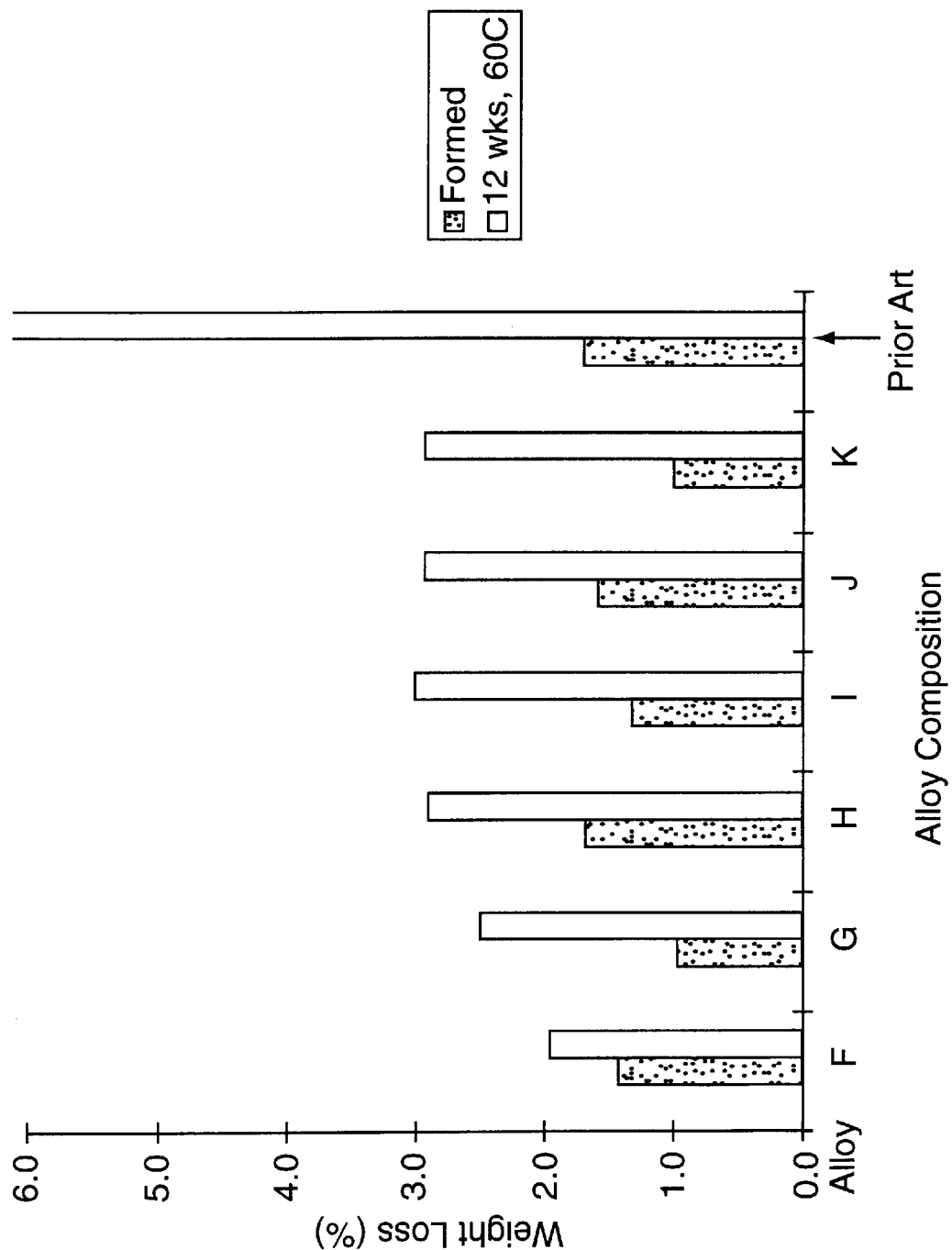
FIG. 8 is a bar graph illustrating how the positive grid corrosion varies, on formation and on float at an elevated temperature, as the grid alloy composition is varied.
Figure 9:
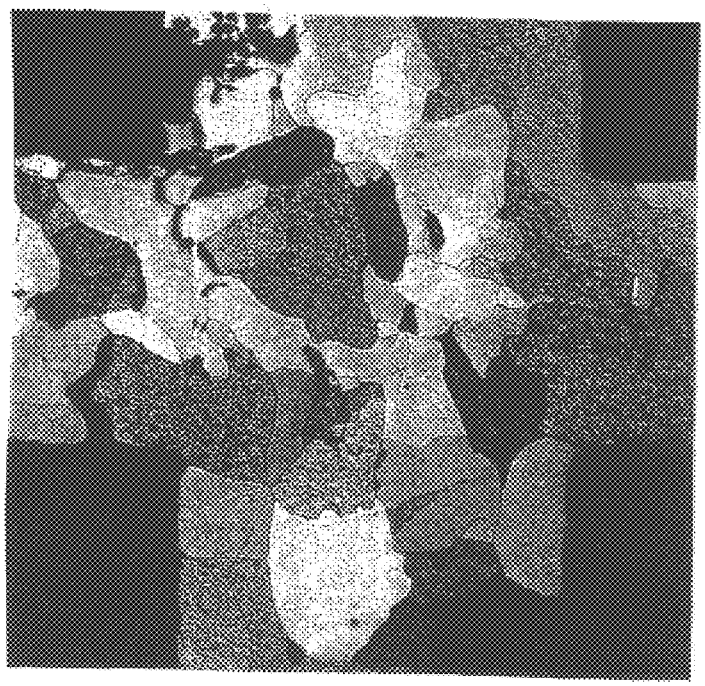
FIGS. 9–10 are photomicrographs at 20× and 50× amplification, respectively, of an upper intersection of a positive grid using a prior art alloy and illustrating the grid microstructure after exposure for 12 weeks at 60° C.
Figure 10:
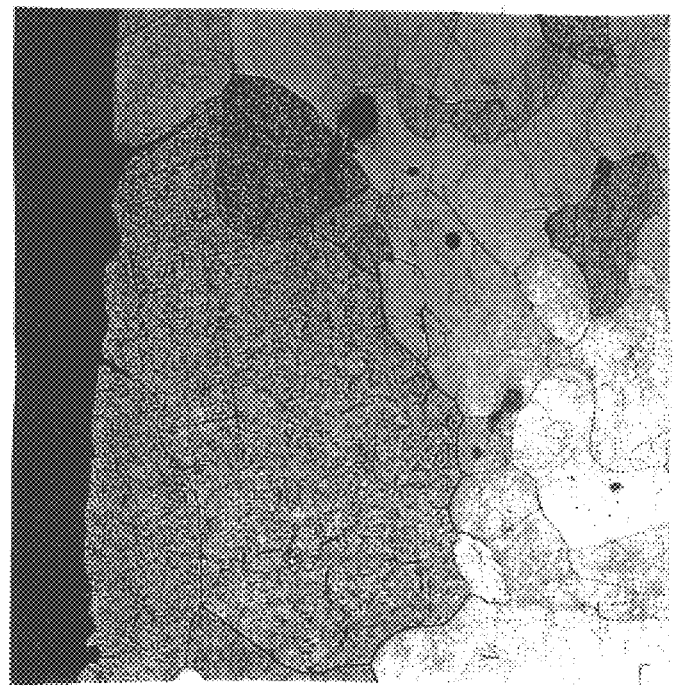
Figure 11:
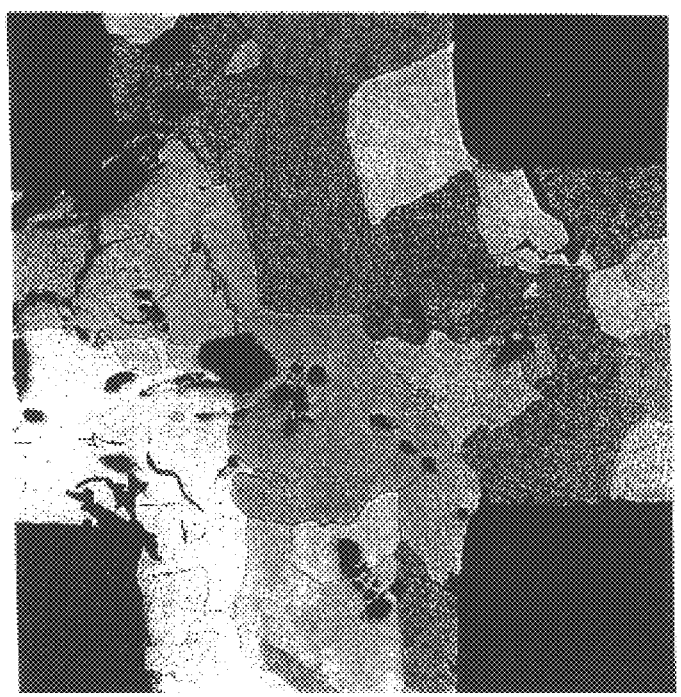
FIGS. 11–12 are photomicrographs similar to FIGS. 9–10, except showing the grid microstructure of a lower intersection.
Figure 12:
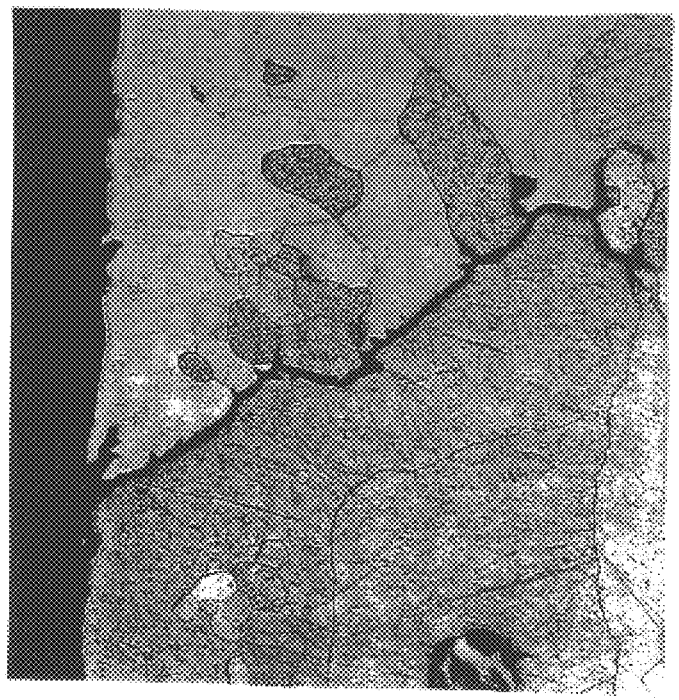
Figure 13:
FIGS. 13–16 are photomicrographs similar to FIGS. 9–12, except showing the grid microstructure after formation of a positive grid made of an alloy according to the present invention at 20× and 200× amplification.
Figure 14:
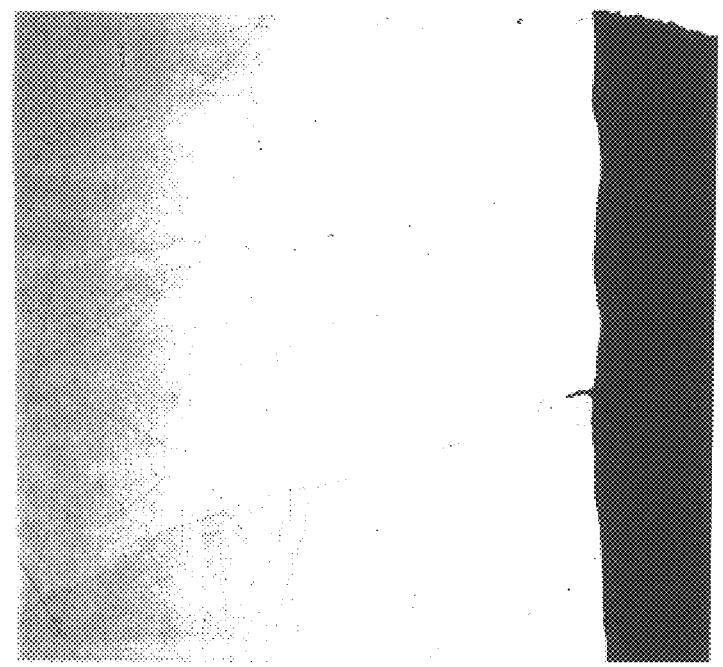
Figure 15:
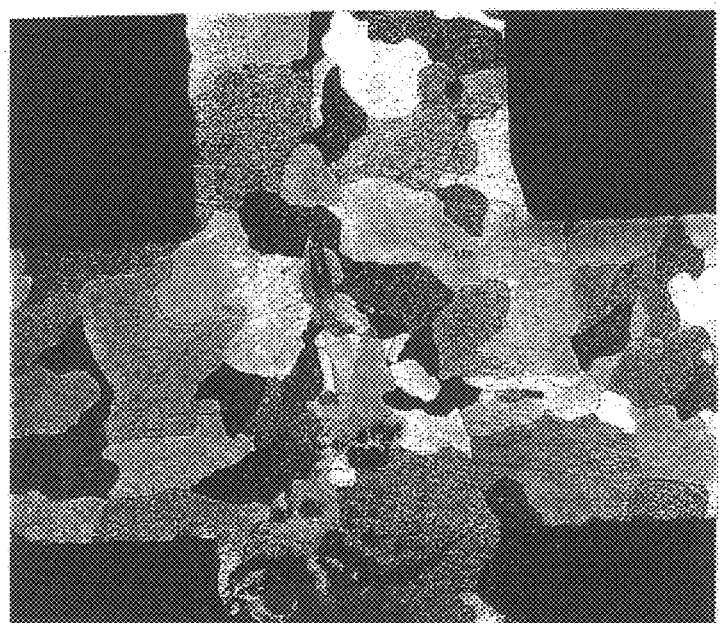
Figure 16:
Figure 17:
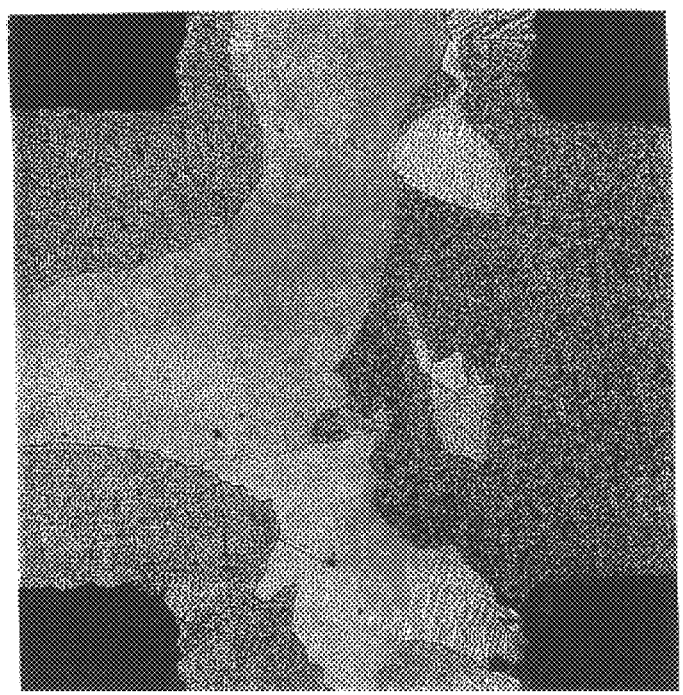
FIGS. 17–20 are photomicrographs similar to FIGS. 9–1, except showing the grid microstructures after a 12 week exposure at 60° C. and as 20× and 50× amplification.
Figure 18:
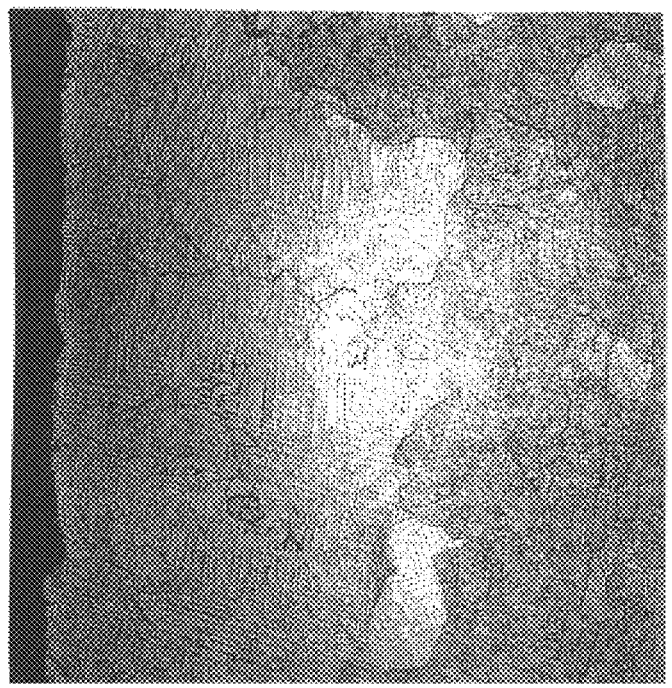
Figure 19:
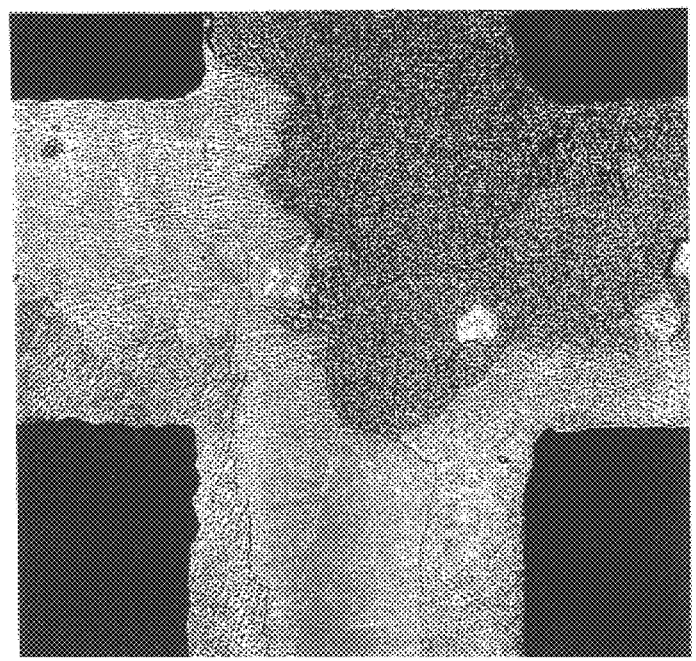
Figure 20:
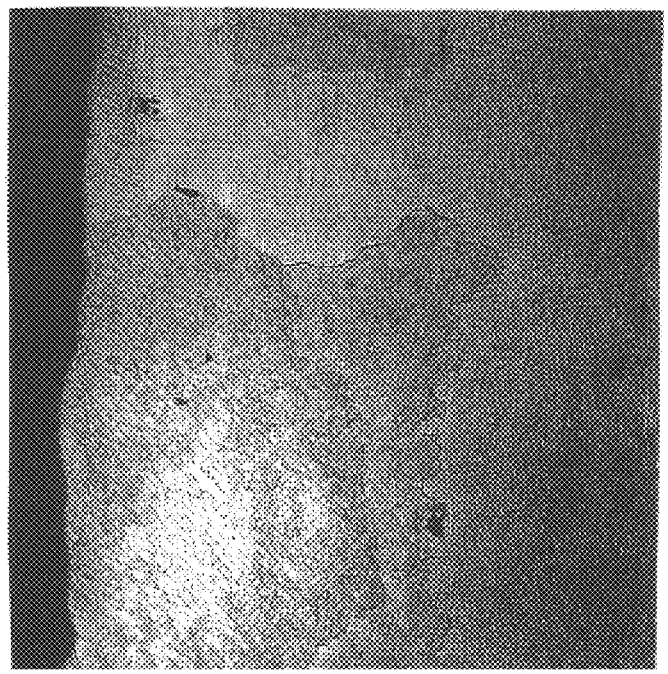
Figure 21:
FIGS. 21–24 are photomicrographs similar to FIGS. 13–16, except showing the grid microstructures using another alloy according to the present invention.
Figure 22:
Figure 23:
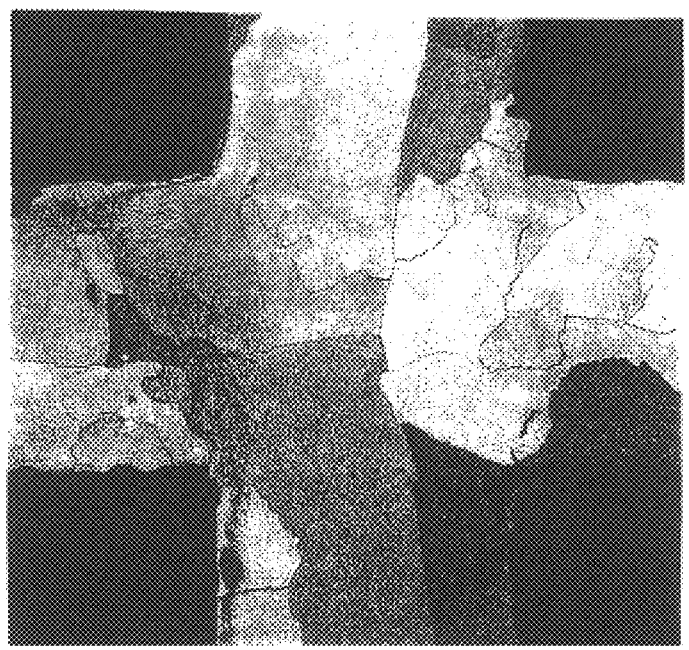
Figure 24:
Figure 25:
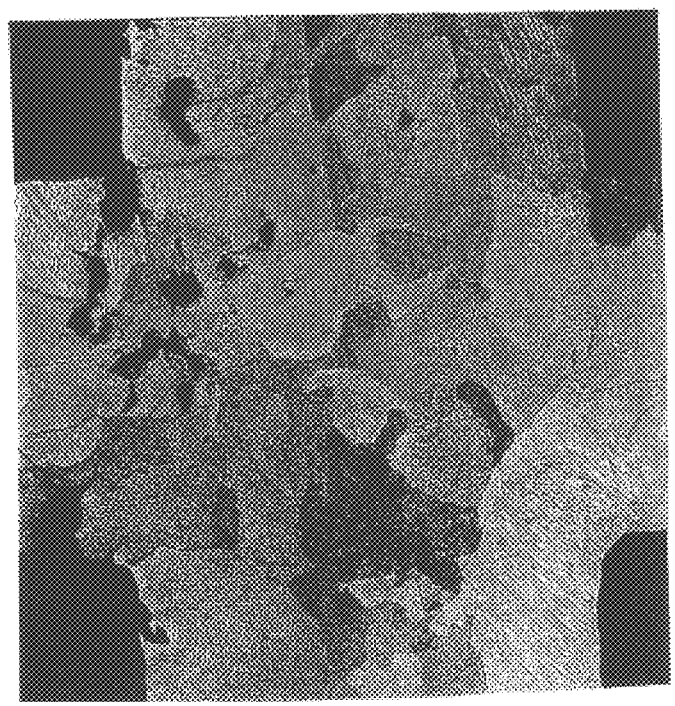
FIGS. 25–28 are photomicrographs similar to FIGS. 17–20, except using the grid alloy composition utilized for the grids shown in FIGS. 21–24.
Figure 26:
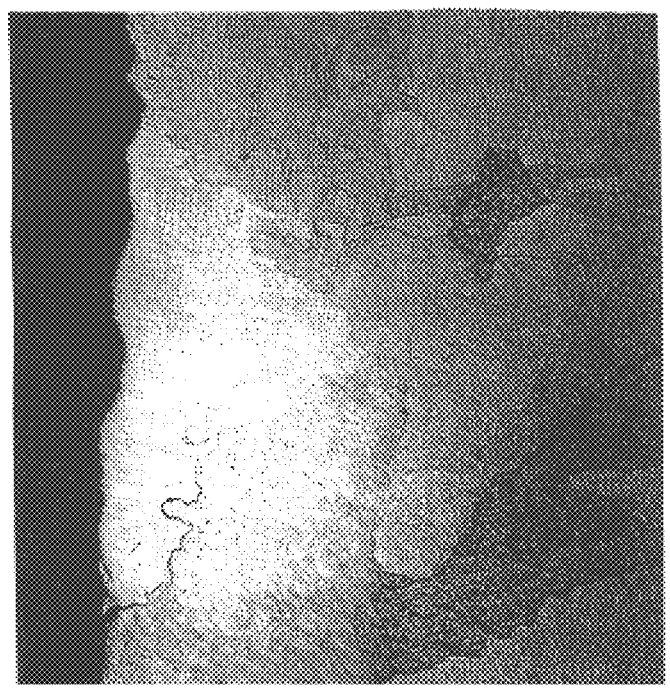
Figure 27:
Figure 28:
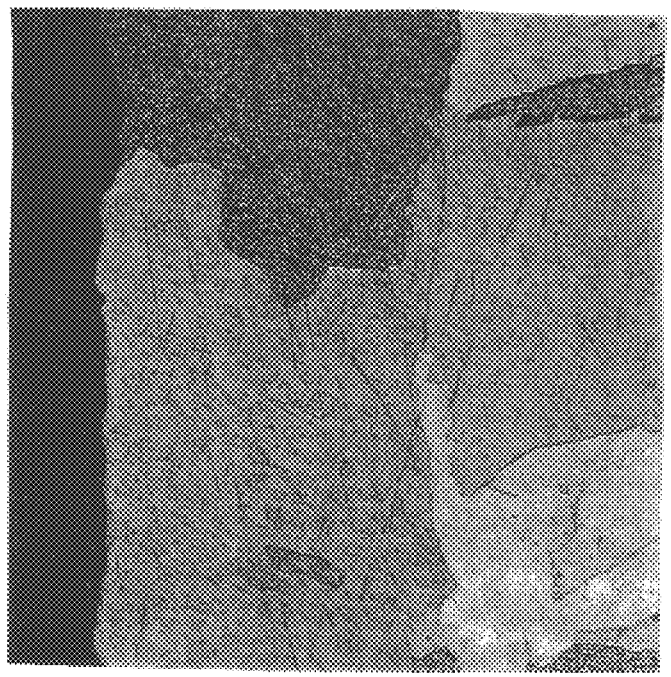

FIG. 8 shows the grid corrosion characteristics of positive grids made from the various alloys identified after formation and after being floated for 12 weeks under the conditions previously identified regarding the grid growth tests. Again, the positive effect of including silver in the positive grid alloys can be seen.

FIGS. 9–28 show the microstructure of positive grids using various alloys. As can be seen from FIGS. 9–12, relatively severe intergranular corrosion occurred under the test condition in the positive grids made with a prior art alloy. In contrast, the primary corrosion which occurred in the positive grids made from Alloy I (FIGS. 13–20) and from Alloy K (FIGS. 21–28), both in accordance with this invention, was uniform; and no intergranular corrosion was noted.

A primary defect in all the grids was cracking with some voids and tears occurring when Alloys I and K were used. It is believed that such defects can be satisfactorily controlled by process design as previously discussed herein.

While particular embodiments of the invention have been shown, it will of course be understood that the invention is not limited thereto since modifications may be made by those skilled in the art, particularly in light of the foregoing teachings. Thus, while the present invention has been described in conjunction with VRLA cells, it should be appreciated that the alloys disclosed herein may be used in any other lead-acid cells or batteries including, for example, automotive (flooded starting, lighting and ignition), bipolar and the like.

What is claimed is:

1. A sealed, lead-acid cell comprising a container normally sealed from the atmosphere in service, at least one positive plate and a negative plate disposed within said container, a separator disposed within said container and separating said positive and negative plates, and an electrolyte substantially completely absorbed in said separator and said plates, said positive plate comprising a grid supporting structure having a layer of active material pasted thereto, said grid supporting structure comprising a lead-based alloy consisting essentially of lead, from about 0.02% to about 0.05% calcium, from about 2.0% to about 3.0% tin, and from about 0.01% to about 0.05% silver, the percentages being based upon the total weight of said lead-based alloy.

2. The cell of claim 1, wherein the calcium content of said lead-based alloy is in the range of about 0.03% to about 0.04%.

3. The cell of claim 1, wherein the tin content of said lead-based alloy is in the range of about 2.0% to about 2.5%.

4. The cell of claim 1, wherein the silver content of said lead-based alloy is in the range of about 0.02% to about 0.04%.

5. The cell of claim 1, wherein the calcium content of said lead-based alloy is in the range of about 0.03% to about 0.04%, the tin content of said lead-based alloy is in the range of about 2.0% to about 3.0%, and the silver content of said lead-based alloy is in the range of about 0.02% to about 0.04%.

6. A positive plate for a sealed, lead-acid cell comprising a grid supporting structure and positive active material pasted thereto, said grid supporting structure comprising a lead-based alloy consisting essentially of lead, from about 0.02% to about 0.05% calcium, from about 2.0% to about 3.0% tin, and from about 0.01% to about 0.05% silver, the percentages being based upon the total weight of the lead-based alloy.

7. The positive plate of claim 6, wherein the calcium content of said lead-based alloy is in the range of about 0.03% to about 0.04%, and the silver content of said lead-based alloy is in the range of about 0.02% to about 0.04%.

8. The positive plate of claim 7, wherein said tin content is in the range of from about 2.0% to about 2.5%.

9. A lead-acid battery comprising a container, at least one positive plate and a negative plate disposed within said container, a separator disposed within said container and separating said positive and negative plates, and an electrolyte, said positive plate comprising a grid supporting structure having a layer of active material pasted thereto, said grid supporting structure comprising a lead-based alloy consisting essentially of lead, from about 0.02% to about 0.05% calcium, from about 2.0% to about 3.0% tin, and from about 0.01% to about 0.05% silver, the percentages being based upon the total weight of said lead-based alloy.

11. The battery of claim 9, wherein the tin content of said lead-based alloy is in the range of about 2.0% to about 2.5%.

10. The battery of claim 9, wherein the calcium content of said lead-based alloy is in the range of about 0.03% to about 0.04%.

12. The battery of claim 9, wherein the silver content of said lead-based alloy is in the range of about 0.02% to about 0.04%.

* * * * *